(12) United States Patent
Vargas et al.

(10) Patent No.: US 9,239,590 B2
(45) Date of Patent: Jan. 19, 2016

(54) APPARATUS COMPRISING A PISTOL GRIP

(71) Applicant: Infinite Peripherals, Elk Grove Village, IL (US)

(72) Inventors: John G. Vargas, Whittier, CA (US); Patrick Dutt, Fontana, CA (US)

(73) Assignee: Infinite Peripherals, Elk Grove Village, IL (US)

( * ) Notice: Subject to any disclaimer, the term of this patent is extended or adjusted under 35 U.S.C. 154(b) by 0 days.

(21) Appl. No.: 14/181,226

(22) Filed: Feb. 14, 2014

(65) Prior Publication Data

US 2014/0233180 A1     Aug. 21, 2014

Related U.S. Application Data

(60) Provisional application No. 61/765,239, filed on Feb. 15, 2013.

(51) Int. Cl.
*G06K 7/10* (2006.01)
*G06F 1/16* (2006.01)

(52) U.S. Cl.
CPC ............ *G06F 1/1613* (2013.01); *G06F 1/1632* (2013.01)

(58) Field of Classification Search
CPC .......................... G06K 7/10881; G06K 7/1098
USPC ................... 235/454, 462.45, 462.47, 472.01
See application file for complete search history.

(56) References Cited

U.S. PATENT DOCUMENTS

| | | | |
|---|---|---|---|
| 5,996,896 A * | 12/1999 | Grabon | 235/472.02 |
| 6,109,528 A * | 8/2000 | Kunert et al. | 235/472.01 |
| 6,999,797 B2 * | 2/2006 | Crawford et al. | 455/564 |
| 7,562,824 B2 * | 7/2009 | Bhatia et al. | 235/462.01 |
| 7,857,286 B1 * | 12/2010 | Huang | 251/322 |
| 8,016,200 B2 * | 9/2011 | Gong et al. | 235/462.47 |

* cited by examiner

*Primary Examiner* — Daniel St Cyr
(74) *Attorney, Agent, or Firm* — Kaplan Breyer Schwarz & Ottesen, LLP

(57) ABSTRACT

A pistol-grip module includes a handle and a coupling member that is configured to couple, mechanically and electrically, to a battery compartment of an active frame. The active frame, which includes at least one electrically powered device, is intended to receive a data-capture device, such as a smart phone. In versions of the pistol-grip module that include a trigger, the trigger can be used to actuate the electrically powered device of the active frame.

20 Claims, 9 Drawing Sheets

APPARATUS COMPRISING A PISTOL GRIP

STATEMENT OF RELATED CASES

This case claims priority of U.S. Provisional Patent application 61/765,239, filed Feb. 15, 2013, which is incorporated by reference herein.

FIELD OF THE INVENTION

The present invention pertains to hand-held data-capture devices.

BACKGROUND OF THE INVENTION

Handheld data-capture devices, such as bar code scanners, smart card readers, hand-held medical computers, mobile devices enabled with POS systems, and the like are becoming ubiquitous. These devices, which are essentially hand-held computers, are available in variety of form factors, including smartphones, handheld PDAs, tablets, and single-purpose devices.

Most of these hand-held data-capture devices include keys and a screen and are intended to be held like a phone. As a consequence, when a user holds the device for use, the wrist is rotated so the hand is in a palm-up orientation and the device is supported by the palm and four fingers (index through pinky). The buttons can be "pressed" using the thumb or the fingers of the free hand.

In scan-intensive applications, the rotated-wrist orientation leads to discomfort and fatigue. For this reason, many hand-held data-capture units are now available with a "pistol grip." The pistol grip, which enables a user to hold the data-capture unit in the manner of hand gun, typically includes a "trigger," which can be used to actuate a function of the unit (e.g., the scanner, etc.).

The pistol grip places the wrist is in a neutral (i.e., non-rotated), "hand-shake" orientation, which results in less discomfort and user fatigue. Furthermore, the trigger of the pistol grip is actuated using the index finger whereas the thumb is used when the device is held in a palm-up configuration. The latter is the far-more fatiguing approach. Alternatively, fingers of the free hand can be used when the device is held in a palm-up configuration. Although not particularly fatiguing, that requires the use of a second hand to operate the data capture device.

In some prior-art hand-held data-capture devices, the pistol grip is an integral part of the device itself; it is not separable. In some others, the pistol grip is an add-on, adapted to removably couple to the data-capture device. For an add-on pistol grip, the manufacturer must address issues such as how to provide a suitably robust mechanical connection between the grip and the device as well as how to create a reliable electrical connection between the trigger of the pistol grip and the data-capture device.

SUMMARY

The present invention provides a way to couple an add-on pistol grip to a hand-held "data-capture device" or "engine" (these terms are used interchangeably herein) without some of the drawbacks of the prior art.

In the illustrative embodiment of the invention, the pistol grip is used in conjunction with an active frame. The active frame is configured to receive and operatively couple to an "engine," which, in the illustrative embodiment, is a smart phone (e.g., the "iPhone™" by Apple, Inc., etc.). The active frame supplements or enhances the capabilities of the engine for use in specific applications. For example, the active frame and engine can be coupled to provide a device particularly useful in medical settings, such as disclosed in U.S. application Ser. No. 61/765,239.

The active frame includes features that require power and, as such, some embodiments of the active frame include a power source. In some embodiments, the active frame is battery powered, wherein the active frame includes a removable battery pack. The battery pack resides in the active frame in an appropriately sized and shaped battery compartment or recess. The compartment includes plural electrical contacts. When a battery pack is inserted in the compartment, contacts on the battery pack engage the electrical contacts in the battery compartment, thereby enabling power to be delivered to the active frame and/or data-capture device.

In the accordance with the illustrative embodiment, a pistol-grip module is provided that includes a coupling member that is sized and configured to be received by the battery compartment in the active frame. The pistol grip module also includes a trigger that actuates at least one function of the active frame and/or data-capture device. For example, some embodiments of the active frame include an optical scanner wherein the trigger of the pistol grip module can be used to actuate the scanner. A battery is disposed in a handle of the pistol-grip module.

The plural electrical contacts in the battery compartment of the active frame include, in addition to power and ground contacts, a contact intended to receive a signal from the trigger for actuating the scanner. Electrical contacts are accessible from the exterior of the coupling member on the pistol-grip module. Once coupled to the active frame, these electrical contacts abut the contacts in the battery compartment of the active frame and are therefore operable to route signal and power to the active frame/data-capture device.

Thus, the battery compartment of the active frame and the coupling member of the pistol-grip module (which has essentially the same shape and size as that of the actual battery pack) form the elements of an interface, both mechanical and electrical, for coupling the pistol grip to the active frame/data-capture device.

By virtue of the aforementioned arrangement, the user can readily reconfigure the active frame/data-capture device from a non-grip implementation to a pistol-grip implementation, as suits a particular work flow. For example, for scan-intensive tasks, a user will typically use the pistol-grip; for communications-intensive tasks, a user might prefer the non-grip implementation.

Consider a setting, such as a hospital or other facility, which will have many data-capture devices in use. When the battery in a dedicated/single purpose data-capture device is depleted, a user will have to exchange that device for one with a charged battery to complete their work shift. In contrast, once the integral battery in a pistol-grip module is depleted, the pistol-grip module can be removed and replaced with another pistol-grip module having a charged battery. In the former case, the facility must have a sufficient number of extra data-capture devices at the ready, costing perhaps $1500 per unit, to replace depleted units. In the latter case, the facility stocks a sufficient number of extra pistol grip modules, costing about $100 per unit, to replace depleted units. When large numbers of units are involved, the cost savings resulting from the pistol-grip module is significant.

Since the pistol-grip module is removable and charged while separated from the data-capture device, a user can keep their data-capture device running nearly 100% of the time by simply exchanging a depleted pistol-grip module for a charged one.

As a function of the intended application, data-capture devices may also be required to meet certain protection standards (i.e., IP protection class). For example, a handheld medical computer for use in a hospital will likely be required to satisfy IP54, which requires protection against contact, dust deposit, and splashed water. In accordance with the illustrative embodiment, the coupling member of the pistol-grip module completes an IP54 seal for the active frame/data-capture device.

Embodiments of the invention provide, among other systems, apparatuses or articles:
- an apparatus comprising a pistol-grip module;
- an apparatus comprising an active frame and pistol-grip module;
- a handheld medical computer; and
- a system comprising plural pistol-grip modules, plural active frames, and a charging system for charging the pistol-grip modules.

DETAILED DESCRIPTION

Definitions

The following terms are defined for use in this disclosure and the appended claims:
"Engine" means a device capable of acquiring, storing, and/or transmitting data, such as a smart phone, a tablet with wireless telecommunications capability, or a data-only device (e.g., iPod®, etc.). The ability to acquire and store data can be native to the capabilities of the engine, or provided via software ("APPs") that are downloaded to and stored in the engine.
"Active frame" means a structure that includes at least one electronic device (e.g., optical scanner, RFID reader, telecommunications capabilities, etc.) and is configured to mechanically and operatively couple to an "engine." In this context, "operatively couple" means that the active frame includes features that enable pass-through activation of or access to features on the engine (e.g., buttons on the active frame as situated such that pressing such a button actuates an underlying button on the engine, or opening a port cover on the active frame provides access to an i/o port of the engine. The active frame is not a part of the engine proper; that is, the active frame is an after-market article.

Figure 6:
FIG. 6 depicts a top, three-quarters perspective view of a mobile handheld medical computer including an engine, active frame, and a pistol-grip module coupled to the active frame.

FIG. 6 depicts device 600 in accordance with the illustrative embodiment of the invention. Device 600 includes engine 102, active frame 104, and pistol-grip module 466.

Engine or data-capture device 102 can be a smart phone, a tablet with wireless telecommunications capabilities, or a data-only device, such as an iPod®. In the illustrative embodiment, engine 102 is a smart phone. Active frame 104, which works in concert with engine 102, is designed for use with a particular engine, based on its dimensions, layout of buttons, i/o ports, telecommunications capabilities, and the like. In the illustrative embodiment, active frame 104 is designed for use with Apple Inc.'s iPhone®5. It is within the capabilities of those skilled in the art, in conjunction with this disclosure, to modify active frame 104 for use with a different engine, as required by the form factor thereof.

By downloading appropriate software applications "APPS" to engine 102, particularly as functionally enhanced by active frame 104, the engine and active frame become suitable for various specialty uses, such as a handheld medical computer, a mobile handheld POS terminal, an inventory/price check device, and so forth. In the illustrative embodiment, device 600 is a handheld medical computer that, for example and without limitation, is capable of optical scanning (e.g., a wrist tag, the label on a vial of medicine, etc.), accessing medical records, and of providing alerts.

As previously discussed, pistol-grip module 466 provides improved ergonomics to the active frames and engines that it is used with. The pistol-grip module also improves work flow and logistics, providing potential cost savings. It is to be understood that a pistol-grip module in accordance with the present disclosure can be coupled to other active frames, as suitably modified to receive other engines, intended for use in the same (i.e., medical) or different applications. After reading this disclosure, it will be within the capabilities of those skilled in art to modify the pistol-grip module for use with such other active frames.

Active frame 104 and pistol-grip module 466 are now described in detail.

Active Frame.

Figure 1:
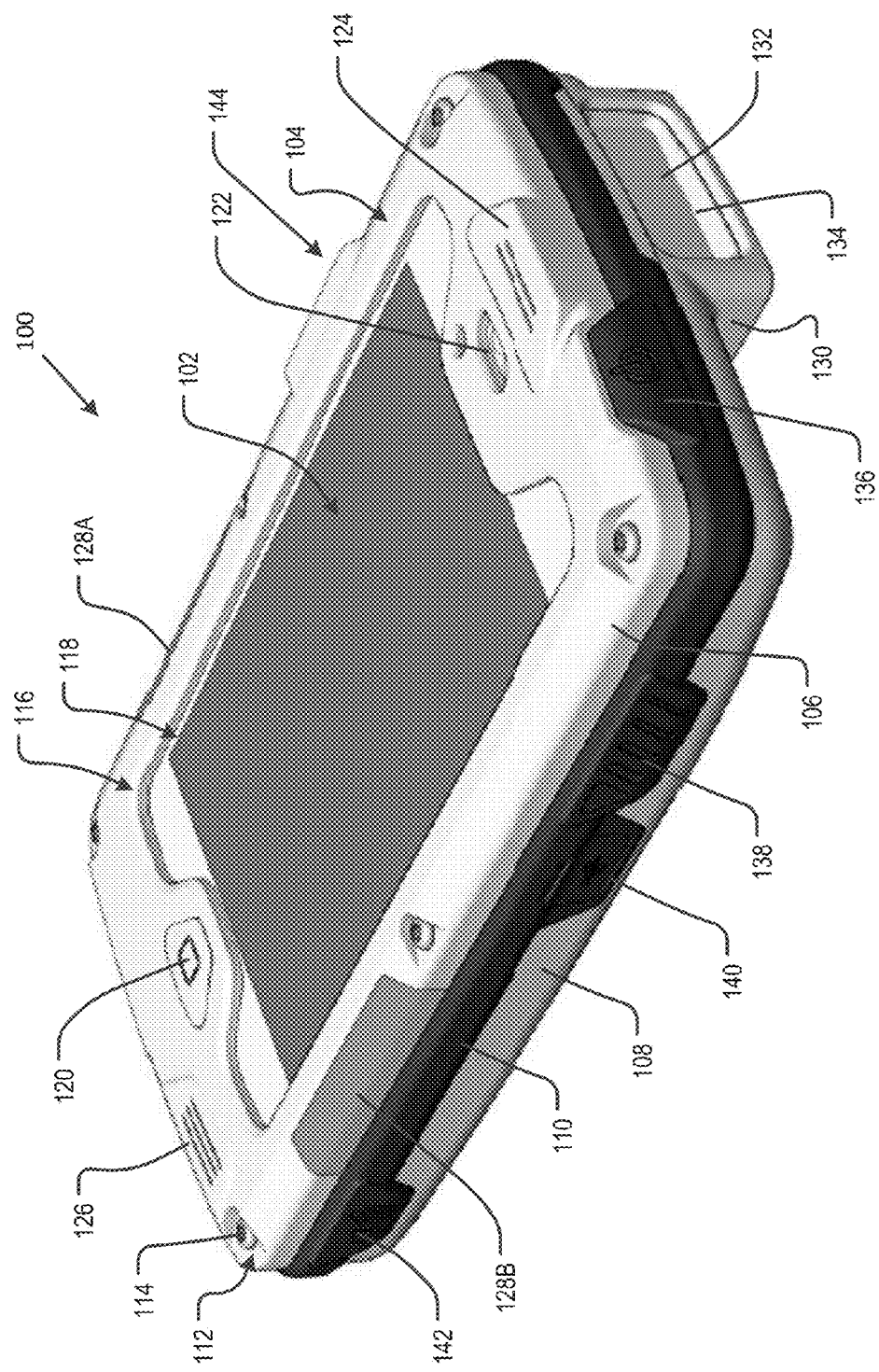
FIG. 1 is a top three-quarters perspective view of an active frame coupled to an engine in accordance with the illustrative embodiment of the invention.

FIG. 1 depicts medical device 100, which comprises active frame 104 and appropriately programmed engine or data-capture device 102.

Active frame 104 includes upper housing 106 and lower housing 108. The upper and lower housings are attached to one another. This can be accomplished in a variety of ways, such as, for example, using screws 114. The screws pass through holes 112 in upper housing 106 and are received by threaded openings (not depicted) in lower housing 108.

Bumper 110 overlies the lip (not depicted) of lower housing 108 and the lip (not depicted) of upper housing 106. When the upper housing and the lower housing are attached to one another, bumper 110 is compressed, thereby providing a dust-tight and water-tight seal. The bumper comprises a resilient material, such as silicone, TPU, or the like. In addition to serving as a seal, the bumper provides a measure of shock protection for active frame 104 and engine 102, so as to prevent damage if device 100 is dropped, providing an IP54 compliant device.

Upper housing 106 comprises opening 116 that enables a user to view a screen of engine 102. In embodiments, such as for use as a medical computer, when dust and liquid protection is important, opening 116 is not "open;" rather, transparent screen protector 118 is attached to the undersurface of the upper housing 106 and "covers" opening 116. In some embodiments, transparent screen protector 118 is a tempered glass that is specially adapted not to interfere with the capacitive touch screen function of the underlying screen of the data-capture device, as appropriate. Such glass is available, for example, from Incipio Technologies, Inc. of Irvine, Calif.

The upper housing is appropriately configured to align with features of the engine. For example, button 120 overlies the "home" button (not depicted) of the engine. Opening 122 overlies the lens of the front camera of engine 102.

Upper housing 106 also includes front speaker 124, microphone 126, and visual indicators 128A and 128B. In the illustrative embodiment, the indicators comprise LED light pipes with multiple color LEDs. The indicators can be used to provide a number of visual alerts/indications to a user. For example, one color indication (e.g., green, etc.) can be used to indicate when device 100 is plugged in and being charged. A second color indication (e.g., blue, etc.) can be used to indicate when the rear speaker is turned on. A third color indication (e.g., red, etc.) can be used as a low battery warning.

Furthermore, indicators 128A and/or 128B can be used to alert the user that an urgent message has been received by engine 102 or active frame 104 (if it is appropriately configured for telecommunications). In some embodiments, the use of different colors can signify a particular type of indication or the severity of an indication, and is user programmable. Furthermore, the "blink" rate of the LEDs can be used for the same purposes, and can also be user programmable.

Lower housing 108 includes bump-out 130, which accommodates optical scanner 132. Scan window 134 is disposed near one end of active frame 104.

A number of buttons are situated along or near bumper 110 that enable pass-through activation of underlying buttons (not depicted) on engine 102. Also, a number of port covers are situated along or near bumper 110 that cover various ports of engine 102. Additionally, there are some buttons situated along or near bumper 110 that actuate functions of active frame 104. The buttons and port covers are formed from the same resilient material as bumper 110. The locations of buttons that are intended for pass-through activation and the location of port covers are a function of the particular engine 102 being used. In the illustrative embodiment, the engine is an iPhone®5, and the location and functionality of certain button and port covers are based on that engine. Those skilled in the art will appreciate that when the active frame 104 is being used with a different engine, the active frame will include a different complement of buttons and/or different locations therefor.

Button 136 is the power button and buttons 144A/B are volume "increase" and "decrease" buttons (the actual buttons are not depicted in FIG. 1 since they are located on an obscured sides of active frame 104). Port cover 140 covers a mini USB port.

Buttons associated with active frame 104 include button 138, which activates optical scanner 132 and button 142, which toggles between front speaker 124 and rear speaker 248 (see FIG. 2), and button 143, which checks the level of charge of the battery (of active frame 104).

Figure 2:
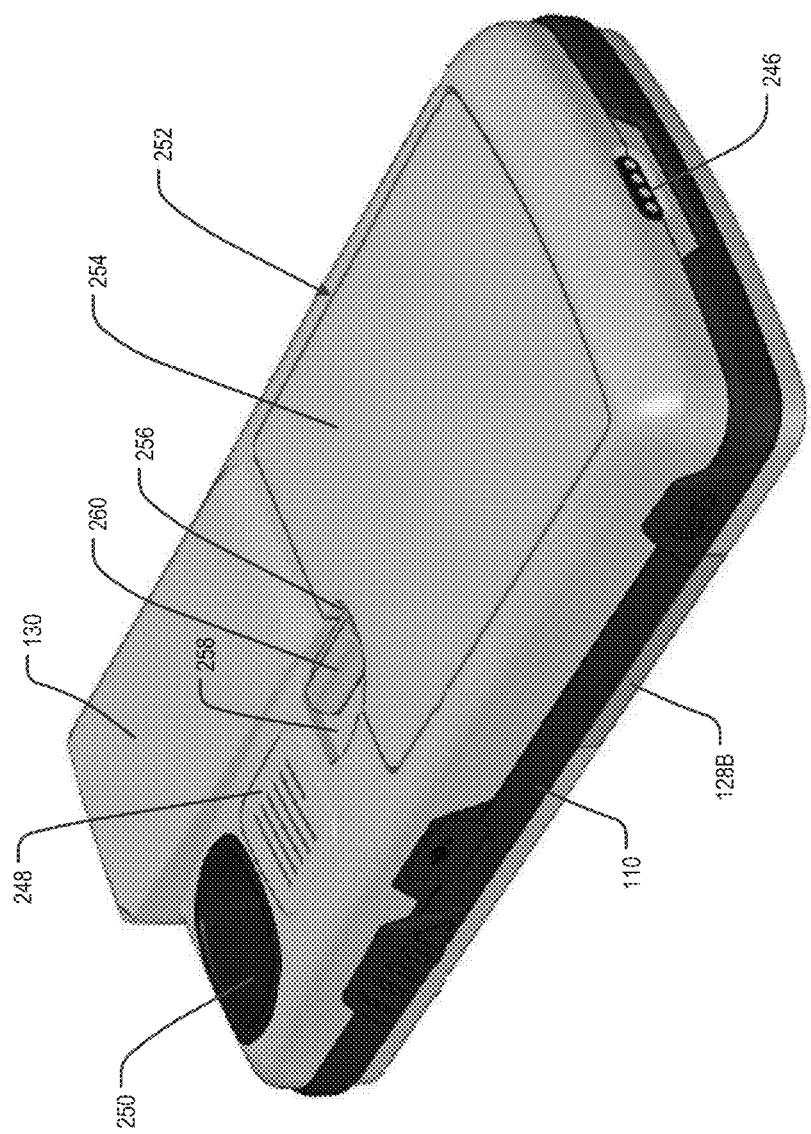
FIG. 2 is a bottom three-quarters perspective view of the active frame of FIG. 1, wherein the orientation of the active frame is rotated 180 degrees with respect to FIG. 1.

FIG. 2 depicts the back of active frame 104, showing a further view of lower housing 108 and some of its features.

Lower housing 108 includes a compartment or recess 252 in which battery pack 254 resides. The battery is hot-swappable and rechargeable. In some embodiments, a lithium polymer battery is used. All native functions of engine 102 continue to function when battery pack 254 is removed. Arm or latch 260, which is disposed in recess 258 in the bottom surface of lower housing 108, is the lock/release for battery pack 254. When battery pack 254 is disposed in battery compartment 252, latch 260 engages recess 256 in battery pack to lock the battery pack to active frame 104.

Contacts 246 enable the rechargeable battery within battery pack 254 to be recharged via a charger.

Lower housing 108 also includes rear speaker 248, which is more powerful than front speaker 124. As previously discussed, button 142 enables a user to activate one or the other of these speakers. For example, if a nurse is having a private conversation, such as when discussing patient information wherein compliance with HIPAA laws is required, front speaker 124 is preferably used. It is also desirable to deactivate rear speaker 248 when possible since its use requires an audio amplification circuit.

Opening 250 (which is covered in FIG. 2) in lower housing 108 is the opening for the rear camera and flash of engine 102 (again, when the engine is an iPhone®5).

Figure 3:
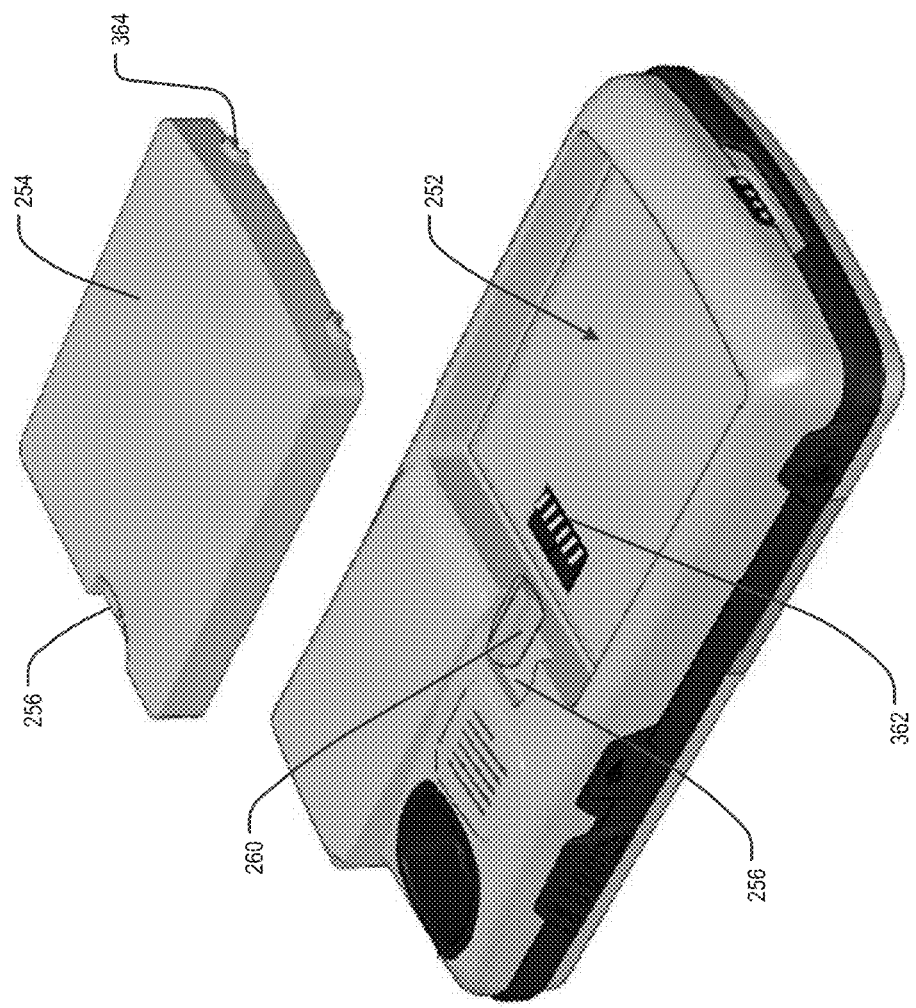
FIG. 3 is a bottom three-quarters perspective view of the active frame of FIG. 1, wherein the battery pack is removed.

FIG. 3 depicts a view of active frame 104 with battery pack 254 removed, revealing battery compartment 252 and electrical contacts 362. The electrical contacts electrically couple the rechargeable battery in battery pack 254 with electrical devices (e.g., optical scanner, indicators, etc.) of active frame 104 to provide power thereto. In some embodiments, one of the electrical contacts 362 electrically couples the rechargeable battery of active frame 104 to the battery within engine 102. This enables battery pack 340 to recharge engine 102. Battery pack 254 includes protuberances 364 that engage complementary features (e.g., notches, etc.) in battery compartment 252 to secure the battery pack in the battery compartment in conjunction with latch 260.

Active frame 104 also includes a main circuit board, not depicted in the figures, which controls the active devices within the frame and enables the frame to electrically interact with engine 102. In some embodiments, active frame 104 includes an RFID device and one or more RF telecommunications receivers (e.g., NFC, Bluetooth, WiFi, etc.) or transceivers. In some embodiments, an antenna, not depicted, is disposed on the exterior of battery pack 254.

Pistol-Grip Module.

Figure 4:
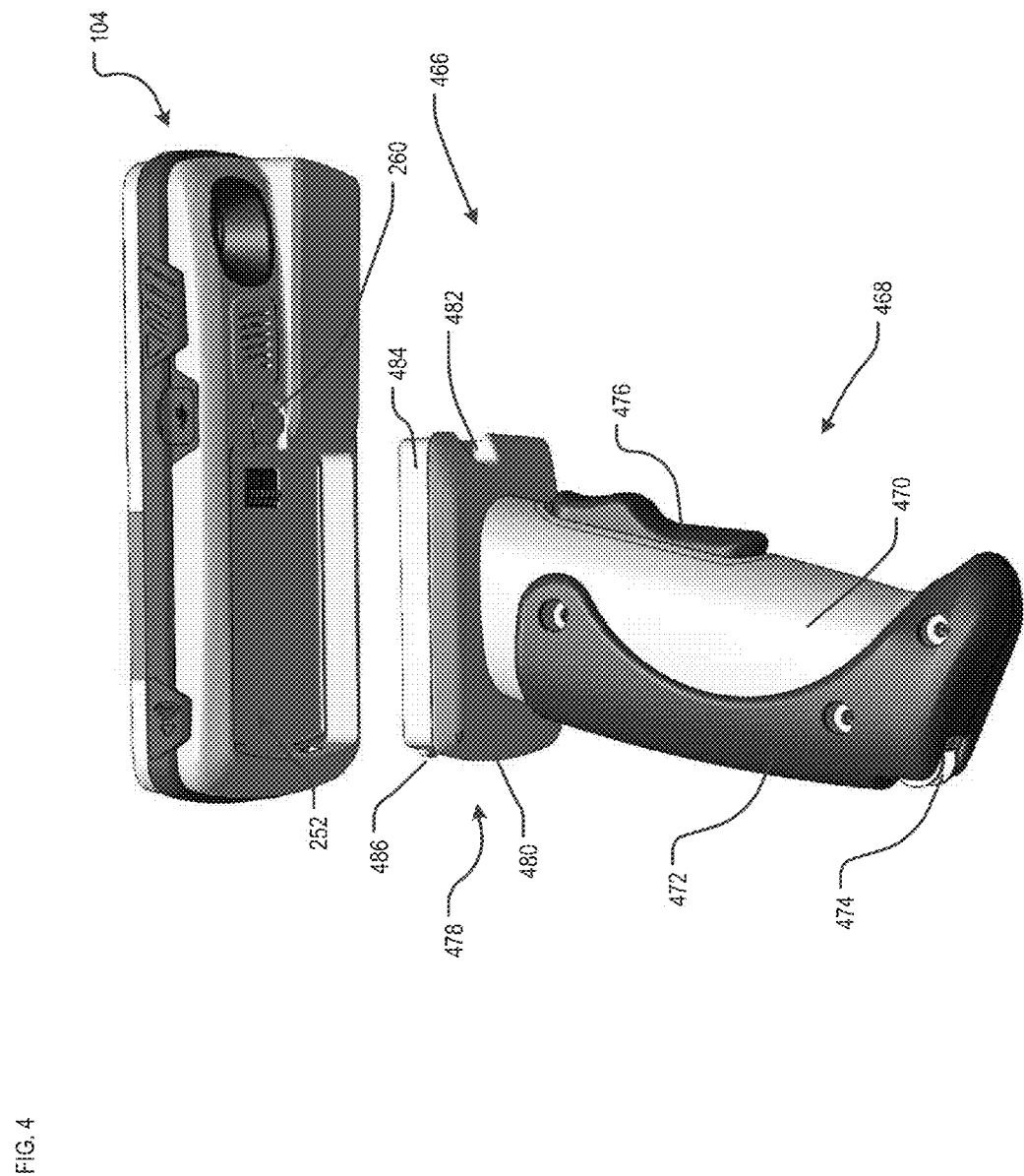
FIG. 4 depicts a bottom perspective view of a pistol-grip module and the active frame.
Figure 5:
FIG. 5 depicts a top perspective view of the pistol-grip module and the active frame.

FIGS. 4 and 5 depict pistol-grip module 466 for use with active frame 104. The salient elements of pistol-grip module include handle 470, grip 472, post 474, trigger 476, and coupling member 478.

In addition to providing a hand hold, handle 470 serves as a housing. For example, contained within handle 470 are a battery, a pcb that includes charging electronics for charging the battery (e.g., miniUSB connector, contacts for use with a charging cradle, LED to indicate charging and battery level, etc.), elements of the trigger 476, etc. Handle 470 is formed from polycarbonate. In some embodiments, handle 470 is internally reinforced via a molded "spine" or reinforcement layer of fiber-filled polycarbonate.

Grip 472 improves the overall ergonomics of handle 470, having a somewhat curved surface and formed from a softer material (e.g., TPU, etc.) than polycarbonate implementations of handle 470. Also, grip 472 provides a styling feature as well.

Post 474 provides a point of attachment for a wrist strap or lanyard. Trigger 476 is operable to actuate an active device of active frame 104 or engine 102. In the illustrative embodiment, trigger 476 is operable to actuate optical scanner 132. Trigger can be formed from TPU.

Coupling member 478 is the feature by which pistol-grip module 466 attaches to active frame 104. Coupling member comprises lower portion 480 and upper portion 484, both of which can be, for example, polycarbonate or other rigid and robust material.

Coupling member 478, attaches, at lower portion 480, to handle 470, such as via cooperating male/female features. To more permanently secure coupling member 478 to the rest of pistol-grip module 466, screws (not depicted) extend through lower portion 480 and into spine or reinforcement layer in handle 470.

Lowe portion 480 of the coupling member includes recess 482, which is analogous to recess 256 of battery pack 254. Recess 482 cooperates with latch 260 to lock coupling member 478, and hence pistol-grip module 466, to active frame 104.

Upper portion 484 is the portion of coupling member 478 that actually engages and couples to active frame 104. In this regard, upper portion 484 is sized and shaped to fit battery compartment 282; that is, it has the same form factor as battery pack 254. Upper portion 484 includes protuberances 486, which are identical to protuberances 364 and are intended to engage complementary features (e.g., notches, etc.) in battery compartment 252 to secure the upper portion 484 of coupling member 478 in the battery compartment in conjunction with latch 260. Protuberances 486 are depicted more clearly in FIG. 5.

As depicted in FIG. 5, the uppermost surface of upper portion 484 of coupling member 478 includes electrical contacts 588. At least one of these contacts is electrically coupled to the battery within handle 470 and at least one of these contacts is electrically coupled to trigger 476.

When upper portion 484 is inserted in and coupled to battery compartment 252, electrical contacts 588 engaged electrical contacts 362 in battery compartment 252. In this fashion, power from the battery in handle 470 is delivered to active frame 104/engine 102. And when trigger 476 is pressed, a signal generated by the trigger is electrically coupled through the appropriate contact to actuate optical scanner 132 (or other device) of active frame 104 or engine 102.

Figure 7:
FIG. 7 depicts a top, three-quarters perspective view of the medical computer of FIG. 6, wherein the view is rotated 180 degrees with respect to FIG. 6.
Figure 8:
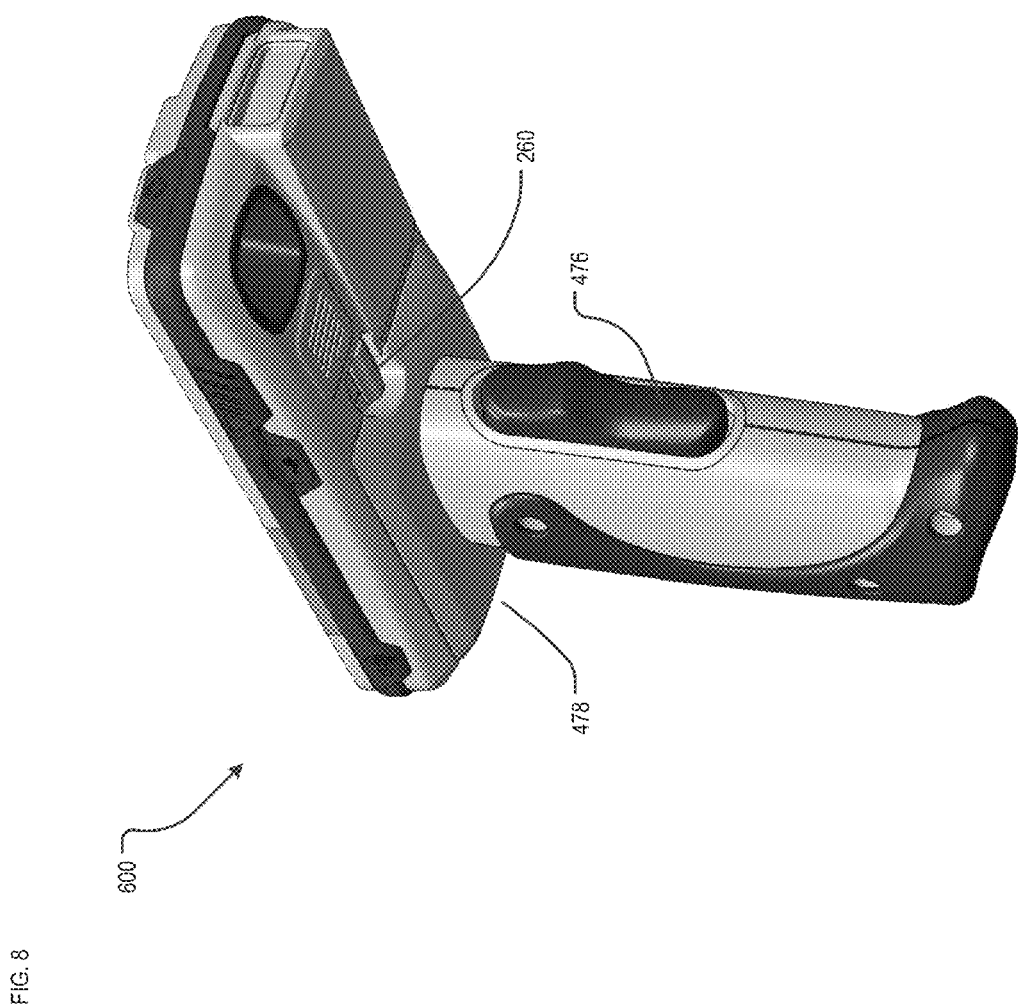
FIG. 8 depicts a bottom three-quarters perspective view of the medical computer of FIG. 6.

FIGS. 6 through 8 depict several views of device 600 in accordance with the illustrative embodiment of the invention. Device 600 includes engine 102, active frame 104, and pistol-grip module 466. As previously discussed, in the illustrative embodiment, device 600 is a handheld medical computer capable of optical scanning (e.g., a wrist tag, the label on a vial of medicine, etc.) via optical scanner 132 of active frame 104, accessing medical records via Apps stored on engine 102 and via the telecommunications capabilities thereof, and providing alerts to a nurse or other user via indicators 128A/B, among any other capabilities.

Figure 9:
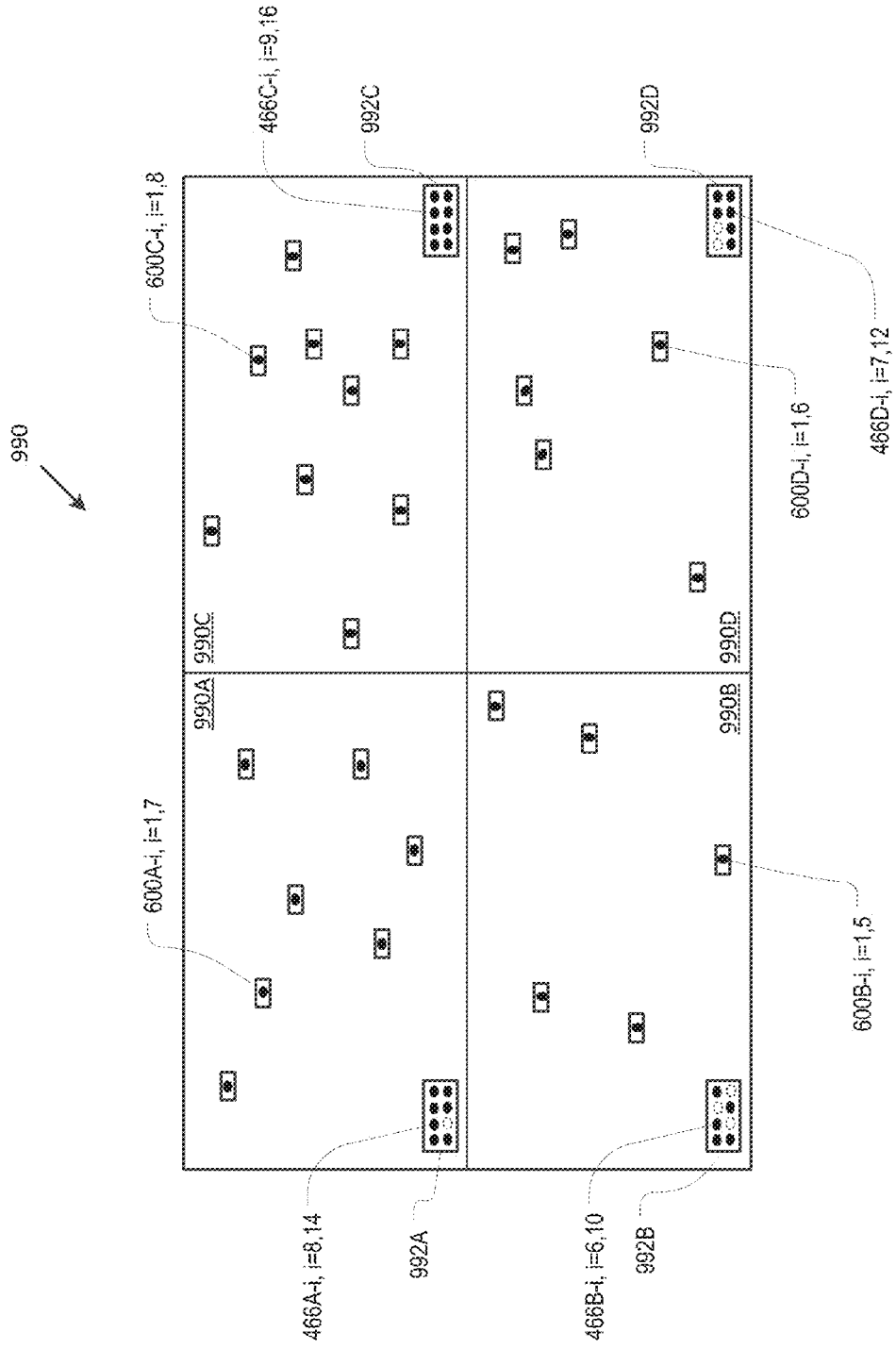
FIG. 9 depicts a system in accordance with an embodiment of the invention.

FIG. 9 depicts facility 990 in which a plurality of devices 600 are in use. The facility is divided into four wings, 900A, 900B, 900C, and 900D. Seven devices 600A-i, i=1,7 are in use in wing 900A, five devices 600B-i, i=1,5 are in use in wing 900B, eight devices 600C-i, i=1,8 are in use in wing 900C, and six devices 600D-i, i=1,6 are in use in wing 900D. Each wing has its own charging station 992A, 992B, 992C, or 992D.

As a shift starts and devices 600 are deployed for use, a number of pistol-grip modules 446 are charging (or fully charged) in the respective charging stations. In the illustrative embodiment, there is a 1:1 ratio, for each wing, between the number of devices 600 in use and the number of pistol-grip modules 446 in charging station 992. As such, there are seven pistol-grip modules 446A-i, i=8,14 charging in charging station 992A, five pistol-grip modules 446B-i, i=6,10 charging in charging station 992B, eight pistol-grip modules 446C-i, i=9,16 charging in charging station 992C, and six pistol-grip modules 446D-i, i=7,12 charging in charging station 992D. In other embodiments, there can be a different ratio between the number of deployed device 600 and charging/charged replacement pistol-grip modules 446.

Thus, wing 600A has seven devices 600A in use and there are seven pistol-grip modules 446A charging or charged at the start of a shift. This provides one spare pistol-grip module 446A for each deployed device 600A. As the battery charge becomes depleted on a particular deployed device 600A-i, the pistol-grip module 466A-i in that device (in which the battery resides) is replaced with a pistol-grip module have a charged battery.

It is to be understood that many variations of the invention can easily be devised by those skilled in the art after reading this disclosure and that the scope of the present invention is to be determined by the following claims.

What is claimed:

1. An apparatus comprising a pistol-grip module, wherein the pistol-grip module includes:
   a handle;
   a battery, wherein the battery is disposed in the handle; and
   a coupling member, wherein the coupling member is attached to an end of the handle, and further wherein:
   (a) at least a first portion of the coupling member is dimensioned and structurally configured to couple to a battery compartment of a first device;
   (b) the first portion of the coupling member includes a plurality of electrical contacts, wherein at least a first electrical contact of the plurality thereof is electrically coupled to the battery; and
   (c) when the first portion of the coupling member is coupled to the battery compartment of the first device, the plurality of electrical contacts electrically engage electrical contacts in the battery compartment, thereby providing power from the battery to the first device.

2. The pistol-grip module of claim 1 and further comprising a trigger, wherein the trigger is disposed on the handle, and wherein the trigger is electrically coupled to a second electrical contact of the plurality thereof on the first portion of the coupling member.

3. The pistol-grip module of claim 1 and further comprising charging electronics for charging the battery.

4. The apparatus of claim 1 and further comprising an active frame, wherein the active frame is the first device, and further wherein the active frame includes at least one electrically powered device, wherein the electrically powered device is powered via power delivered from the battery.

5. The apparatus of claim 4 wherein the electrically powered device is an optical scanner.

6. The apparatus of claim 5 wherein the optical scanner is actuated via the trigger.

7. The apparatus of claim 4 further comprising an engine, wherein the active frame is dimensioned and arranged to receive and mechanically couple to the engine.

8. The apparatus of claim 7 wherein the engine is a smart phone.

9. The apparatus of claim 8 wherein the apparatus is a handheld medical computer, wherein stored in a memory of the engine is an APP that enables the engine to access electronic medical records.

10. An apparatus comprising:
    an active frame, wherein the active frame: (i) includes at least one electrically powered device, (ii) is physically configured to receive and mechanically cooperate with an engine, and (iii) has a battery compartment; and a pistol-grip module, wherein the pistol-grip module includes: (i) a handle, (ii) a battery within the handle, (iii) and a coupling member, wherein the coupling member is attached to an end of the handle, and further wherein at least a first portion of the coupling member is physically configured to securely couple to the battery compartment of the active frame.

11. The apparatus of claim 10 and further wherein, when coupled to the battery compartment, the coupling member provides creates an electrical coupling between the active frame and the pistol-grip module.

12. The apparatus of claim 10 and further comprising a battery disposed in the handle of the pistol-grip module.

13. The apparatus of claim 12 wherein the battery is rechargeable.

14. The apparatus of claim 13 wherein the pistol-grip module further comprises charging electronics for charging the battery.

15. The apparatus of claim 10 wherein the pistol-grip module further comprises a trigger, wherein the trigger is disposed on the handle, and further wherein the trigger is operable to actuate the at least one electrically powered device of the active frame.

16. A system comprising:
a first plurality of active frames, wherein each active frame thereof: (i) includes at least one electrically powered device, (ii) is physically configured to receive and mechanically cooperate with an engine, and (iii) has a battery compartment;
a second plurality of pistol-grip modules, wherein each pistol-grip module includes: (i) a handle, (ii) a battery within the handle, (iii) charging electronics for charging the battery, and (iv) a coupling member, wherein the coupling member is attached to an end of the handle, and further wherein at least a first portion of the coupling member is physically configured to securely couple to the battery compartment of the active frame, wherein there are fewer active frames in the first plurality thereof than pistol-grip modules in the second plurality thereof; and
a battery charging system that electrically couples to the charging electronics, the battery charging system operable to simultaneously charge at least some of the pistol-grip modules in the second plurality thereof that are not engaged to active frames, thereby providing charged pistol-grip modules to replace pistol-grip modules that are charge-depleted due to use with the active frames.

17. The system of claim 16 further comprising a plurality of the engines.

18. The system of claim 16 wherein each pistol-grip module further comprises a trigger, wherein the trigger is operable to actuate the electrically powered device.

19. The system of claim 18 wherein the electrically powered device is an optical scanner.

20. The system of claim 16 wherein the first portion of the coupling member includes electrical contacts that engage electrical contacts in the battery compartment of the active frame.

* * * * *